(12) United States Patent
Li

(10) Patent No.: US 7,720,994 B2
(45) Date of Patent: May 18, 2010

(54) METHOD FOR SUPPRESSION OF MULTICAST JOIN/PRUNE MESSAGES FROM EXTRANET RECEIVERS

(75) Inventor: Jennifer Li, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1451 days.

(21) Appl. No.: 11/036,294

(22) Filed: Jan. 13, 2005

(65) Prior Publication Data

US 2006/0168047 A1  Jul. 27, 2006

(51) Int. Cl.
G06F 15/173 (2006.01)
H04L 12/28 (2006.01)
H04L 12/56 (2006.01)

(52) U.S. Cl. .......................... 709/238; 370/351; 370/390

(58) Field of Classification Search ................. 709/206, 709/238
See application file for complete search history.

(56) References Cited

U.S. PATENT DOCUMENTS

| | | | | |
|---|---|---|---|---|
| 5,394,402 A | * | 2/1995 | Ross | 370/402 |
| 5,742,604 A | * | 4/1998 | Edsall et al. | 370/401 |
| 5,959,989 A | * | 9/1999 | Gleeson et al. | 370/390 |
| 6,205,488 B1 | * | 3/2001 | Casey et al. | 709/238 |
| 6,331,983 B1 | * | 12/2001 | Haggerty et al. | 370/400 |
| 6,594,703 B1 | * | 7/2003 | Li | 709/235 |
| 6,751,220 B1 | * | 6/2004 | Li | 370/390 |
| 7,317,722 B2 | * | 1/2008 | Aquino et al. | 370/390 |
| 7,346,053 B1 | * | 3/2008 | Leung et al. | 370/390 |
| 7,478,167 B2 | * | 1/2009 | Ould-Brahim et al. | 709/238 |
| 2002/0001310 A1 | * | 1/2002 | Mai et al. | 370/390 |
| 2002/0067725 A1 | * | 6/2002 | Oguchi et al. | 370/390 |
| 2002/0085506 A1 | * | 7/2002 | Hundscheidt et al. | 370/254 |
| 2003/0079040 A1 | * | 4/2003 | Jain et al. | 709/238 |
| 2003/0123453 A1 | * | 7/2003 | Ooghe et al. | 370/395.53 |
| 2003/0135644 A1 | * | 7/2003 | Barrett | 709/238 |
| 2003/0165140 A1 | * | 9/2003 | Tang et al. | 370/393 |
| 2003/0174725 A1 | * | 9/2003 | Shankar | 370/428 |
| 2003/0218980 A1 | * | 11/2003 | Fukushima et al. | 370/230 |
| 2004/0010616 A1 | * | 1/2004 | McCanne | 709/238 |
| 2004/0223498 A1 | * | 11/2004 | Sanderson et al. | 370/395.52 |

(Continued)

OTHER PUBLICATIONS

Estrin, et al., Protocol Independent Multicast-Sparse Mode (PIM-SM): Protocol Specification, RFC 2362, Jun. 1998.*

(Continued)

Primary Examiner—Saleh Najjar
Assistant Examiner—Robert Shaw
(74) Attorney, Agent, or Firm—Hickman Palermo Truong & Becker LLP

(57) ABSTRACT

A method of suppressing the number of PIM messages from extranet receivers is disclosed. Each receiver, before sending a PIM message, first searches for any other receivers other than itself. If there are no other receivers, then the PIM message is sent; otherwise, the receiver suppresses sending the PIM message. PIM Join, triggered Join, and Prune messages may be suppressed. If there are multiple receivers, the PIM messages are sent by a source Extranet receiver located in a provider edge router, for example. The receiver sends the PIM messages for the rest of the Extranet receivers in the provider edge router, and also maintains a counter, ensuring that only one PIM message is sent within a specified time period. As a result, the number of PIM messages traversing core elements of a service provider network may be greatly reduced.

22 Claims, 5 Drawing Sheets

U.S. PATENT DOCUMENTS

| | | | |
|---|---|---|---|
| 2005/0105524 A1* | 5/2005 | Stevens et al. | 370/389 |
| 2006/0002391 A1* | 1/2006 | Takihiro et al. | 370/390 |
| 2006/0007930 A1* | 1/2006 | Dorenbosch | 370/390 |
| 2006/0088031 A1* | 4/2006 | Nalawade | 370/390 |

OTHER PUBLICATIONS

Arup Acharya and Frederic Griffoul, Native IP Multicast Support in MPLS, Lecture Notes in Computer Science:Networked Group Communication, Springer Berlin / Heidelberg, 1999, pp. 204-2150 ISBN 978-3-540-66782-7.*

Jim Guichard; Ivan Pepelnjak; MPLS and VPN Architectures, Cisco Press, Oct. 31, 2000 ISBN-10: 1-58705-002-1 ISBN-13: 978-1-58705-002-2.*

Jim Guichard; Ivan Pepelnjak; Jeff Apcar, MPLS and VPN Architectures, vol. II, Cisco Press, Jun. 6, 2003 ISBN-10: 1- 58705-112-5 ISBN-13: 978-1-58705-112-8.*

Arup Acharya and Frederic Griffoul, Native IP Multicast Support in MPLS, Lecture Notes in Computer Science:Networked Group Communication, Springer Berlin / Heidelberg, 1999, pp. 204-215 ISBN 978-3-540-66782-7.*

Jim Guichard; Ivan Pepelnjak; MPLS and VPN Architectures, Cisco Press, Oct. 31, 2000 ISBN-10: 1-58705-002-1 ISBN-13: 978-1-58705-002-2.*

Jim Guichard; Ivan Pepelnjak; Jeff Apcar, MPLS and VPN Architectures, vol. II, Cisco Press, Jun. 6, 2003 ISBN-10: 1-58705-112-5 ISBN-13: 978-1-58705-112-8.*

Stephen Deering, et al., "The PIM Architecture for Wide-Area Multicast Routing", IEEE/ACM Transaction on Networking, vol. 4, No. 2, Apr. 1996, 11 pgs.

Dino Farinacci, et al., "Multicast Tag Binding and Distribution Using PIM <draft-farinacci-multicast-tagsw-00.txt>", Network Working Group Internet Draft Memo, dated Dec. 1996, 6 pgs.

Microsoft TechNet, "PIM-SM Multicast Routing Protocol", copyright 2006, 36 pgs.

Cisco, "Multicast Subsecond Convergence", Cisco IOS Release 12.0(22)S, 28 pgs.

Dirk Ooms, et al., "MPLS for PIM-SM", submission to MPLS Working Group, dated Nov. 1998, 7 pgs.

* cited by examiner

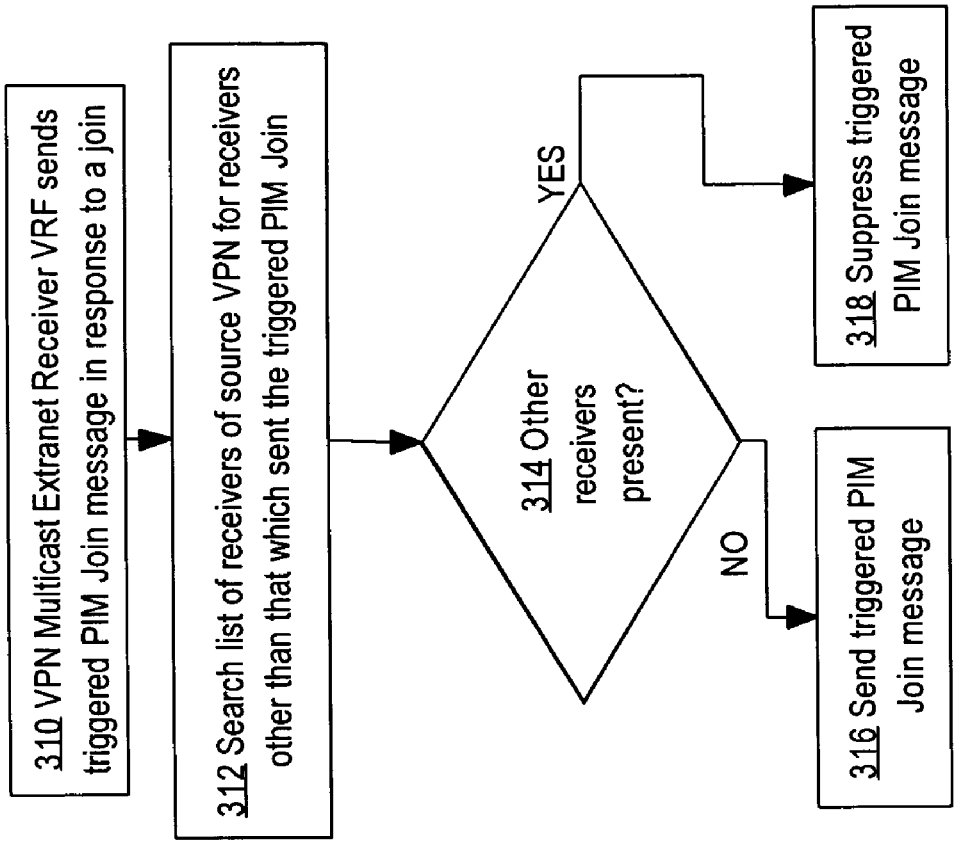

METHOD FOR SUPPRESSION OF MULTICAST JOIN/PRUNE MESSAGES FROM EXTRANET RECEIVERS

FIELD OF THE INVENTION

The present invention generally relates to suppressing the number of messages sent from a receiver node to a source node in a network multicast group. The invention relates more specifically to a method for suppressing PIM messages sent by extranet receivers in an extranet VPN multicast computer network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Multicasting technology is a bandwidth-conserving network technology that reduces network traffic by simultaneously delivering a single stream of information to thousands of recipients. Applications that can use multicast include videoconferencing, corporate communications, distance learning, and distribution of software, stock quotes, and news. Internet Protocol (IP) Multicast delivers source traffic to multiple receivers without adding any additional burden on the source or the receivers, and while using the least network bandwidth of any competing technology.

Multicasting is based on the concept of a group. An arbitrary group of receivers expresses an interest in receiving a particular data stream. Receivers may include network infrastructure elements, such as routers and switches, or end station devices, such as workstations or personal computers. A multicast group does not have any physical or geographical boundaries; receivers (also termed "hosts") can be located anywhere in the Internet. Hosts that are interested in receiving data flowing to a particular group must join the group. In a typical approach, Internet Group Management Protocol (IGMP) is used to dynamically register individual hosts in a multicast group on a particular LAN. Hosts identify group memberships by sending IGMP messages to a local multicast-enabled router. Under IGMP, routers listen to IGMP messages and periodically send out queries to discover which groups are active or inactive on a particular subnet.

To receive a data stream associated with a group, a receiver must be a member of the group. Multicast traffic flows from the source to the multicast group using a distribution tree that connects all of the sources to all of the receivers in the group. Distribution trees define the path that multicast traffic takes through the network to arrive at group members. Distribution trees comprise either source trees or shared trees. A distribution tree may be shared by all sources (a shared tree), or a separate distribution tree can be built for each source (a source tree). The shared tree may be one-way or bi-directional.

For a source to build a distribution tree, sources such as routers implement Protocol Independent Multicast (PIM) in software. PIM software forwards IP Multicast traffic using the standard Unicast routing table that is maintained in the router. PIM uses the Unicast routing table to decide if the source of an IP multicast packet has arrived on an optimal path from the source. Typically, the router sends PIM messages upstream to the source to refresh the forwarding state once every sixty (60) seconds. Thus, receivers notify a source that they want to receive the data stream by sending the PIM messages to the source. Using PIM in this manner results in the most efficient delivery of data to multiple receivers possible.

Because of increasing usage of IP Multicast in the networks of business enterprises, network service providers who offer Layer 3 Virtual Private Network (VPN) services have moved to offer IP Multicast-enabled VPNs. A VPN provides secure, private network connectivity across a non-secure or shared infrastructure, such as the internetworks owned and operated by Internet Service Providers (ISPs). VPN multicasting offers the same multicasting technology as conventional IP multicast, but traverses shared infrastructure elements between the source and the receivers. Multicast Virtual Private Network service aims to provide the same policies and performance as a private network, without requiring enterprises to purchase dedicated lines or service.

In Multicast Virtual Private Network (MVPN) service, a service provider establishes a secure logical connection or "tunnel" between provider edge (PE) routers in the ISP network for communication of multicast information. The PE routers transmit IP multicast traffic for default Multicast Distribution Trees (MDTs) and Data MDTs across the MDT Tunnel. The MDT Tunnel provides protection and integrity for the private data involved in the multicast VPN, since that data travels over public connections of the ISP. Information identifying the PE routers involved in a VPN, and the receivers that are authorized to receive VPN traffic, are stored in a VPN routing/forwarding ("VRF") table. The number of multicast sources in a default MDT group is equal to the number of PE routers connected to the VRF table using the default MDT group.

The approach described above for VPN multicasting was designed for applications on an Intranet, in which all sources and receivers are in the same domain and have the same administrative scope. However, there is a present need to expand VPN multicasting for use in an Extranet, in which sources and receivers are not in the same domain or same administrative scope. To extend VPN multicasting to an Extranet, a VRF can be established on an Extranet source, so that the Extranet source can communicate with each VPN associated with a PE router that wishes to receive data from the Extranet source. However, this approach to VPN Multicasting on an Extranet causes complications because of the VPN boundary line and the different administrative scopes.

In particular, in the current approach PIM messaging applied to VPN Multicasting on an Extranet causes certain participating network elements to send far too many messages. For example, by conforming to conventional PIM protocol operations, the Multicast VPN Extranet routers send PIM messages for each VRF in a PE router to a Reverse Path Forwarding (RPF) neighbor. In the case of multicast VPN, the RPF interface is the MDT Tunnel. Therefore, for every VRF receiver, a PIM message is sent through the MDT Tunnel, even though sending only one PIM message is needed.

The resulting number of PIM messages causes an unnecessary amount of network traffic. For example, if a multicast group has 100 VPNs established in a PE router, then 100 PIM messages are sent through the MDT Tunnel. Processing the PIM messages consumes resources on each router. Additionally, the MDT tunnel becomes flooded with unnecessary PIM messages, thereby consuming unnecessary bandwidth.

Based on the foregoing, there is a clear need for an approach to reduce the number of PIM messages that are sent from an Extranet receiver in a VPN multicasting network.

BRIEF DESCRIPTION OF THE DRAWINGS

The present invention is depicted by way of example, and not by way of limitation, in the figures of the accompanying drawings and in which like reference numerals refer to similar elements and in which:

FIG. 3A is a flow diagram showing steps in one embodiment of a method of suppressing PIM Join messages sent by Extranet receivers.

FIG. 3B is a flow diagram showing steps in one embodiment of a method of suppressing triggered PIM Join messages sent by Extranet receivers.

DETAILED DESCRIPTION

A. Structural Overview

A method and apparatus for suppressing the number of PIM messages from Extranet receivers in a VPN multicast network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
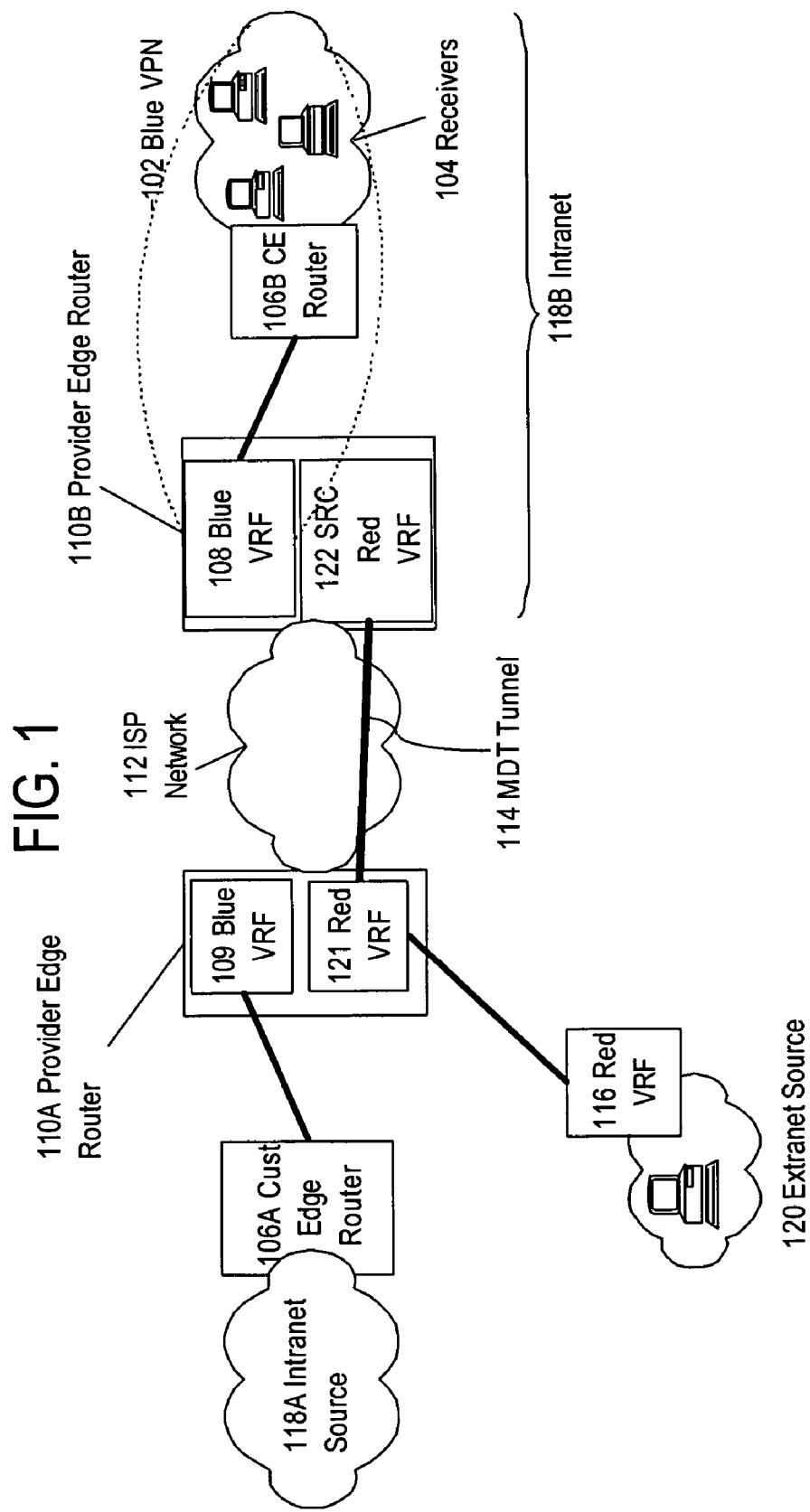
FIG. 1 is a block diagram that shows a configuration of a multicast Virtual Private Network (VPN) as applied to an Extranet.

FIG. 1 is a block diagram that shows a configuration of a multicast Virtual Private Network (VPN) as applied to an Extranet. A multicast information source element, such as a workstation, router or switch, is located in Intranet 118, which also includes a customer edge (CE) router 106A. The CE router 106A is communicatively coupled to provider edge (PE) router 110A, which is an element of a service provider or ISP network 112. The ISP network 112 further includes a second PE router 110B that is communicatively coupled to a CE router 106B that can route information to one or more receivers 104.

Another multicast information source element is located in Extranet 120, and for convenience this element is also termed Extranet source 120 in this description. Extranet source 120 may comprise a workstation, router, switch, etc.

For purposes of illustrating a simple example, FIG. 1 shows a limited number of routers, networks, links and other elements. However, in other embodiments, the techniques described herein can be practiced with other configurations that have any number of elements. The use of thousands of virtual private networks and receivers is specifically contemplated.

The configuration of FIG. 1 supports one or more VPNs. As an example, receivers 104 participate in a Blue VPN 102 that is supported using a first Blue VRF 109 at PE router 110A and a second Blue VRF 108 at PE router 110B. Extranet source 120 participates in a Red VPN that is supported using a Red VRF 116 at an extranet network element, a Red VRF 121 at PE router 11A, and a source Red VRF 122 at PE router 110B.

CE Router 106A is coupled to Blue VRF 109. A Multicast Distribution Tree (MDT) Tunnel 114 connects Red VRFs 121, 122. Blue VRF 108 is coupled to CE Router 106B.

The terms "Blue" and "Red" are arbitrary labels that are used to uniquely identify particular VPNs; in a practical embodiment, any other label may be used.

B. Functional Overview

1. Suppressing Unnecessary Join Messages

Referring again to FIG. 1, in operation, PE router 110A transmits IP multicast traffic for default Multicast Distribution Trees and Data MDTs across the MDT Tunnel 114. The MDT tunnel provides protection and integrity of the data traveling over elements of the ISP network 112. When one of the receivers 104 in the Blue VPN 102 wants to join or leave the Multicast group, the receiver sends a PIM message to the CE router 106B, which passes the PIM message to PE router 110B. The Blue VRF 108 for the Blue VPN located in the PE router 110B then sends the PIM message to the Red VRF 116 located at the Extranet source 120. The Extranet source 120 can then build its distribution tree and send multicast information to the group, if needed.

In operation with multiple VPNs, each VRF for each VPN acts independently and periodically sends, for the purpose of preventing timeout of forwarding state information, a PIM message to its RPF neighbor. In the example of FIG. 1, MDT Tunnel 114 is considered an RPF neighbor for both the Blue VRF 108 and the source Red VRF 122. Accordingly, in conventional practice, both periodically send a PIM message to the MDT Tunnel 114 in an effort to update forwarding state for any upstream routers and prevent timeout. Each such PIM message is carried by core network elements of ISP network 112 along the MDT Tunnel 114. However, elements in the ISP network 112 only need to receive one PIM message to accomplish the goal of preventing timeout.

According to one embodiment, when a VPN multicast Extranet receiver—such as a VRF acting as a multicast VPN Extranet receiver—needs to send a periodic PIM Join message, the receiver first searches to determine whether any multicast VPN Extranet receivers other than itself currently exist. If there are no other receivers, then the receiver is free to send a PIM Join message. Otherwise, the receiver does not send the periodic PIM Join message. Using this approach, unnecessary PIM Join messages are suppressed.

FIG. 3A is a flow diagram showing steps in one embodiment of a method of suppressing PIM Join messages sent by Extranet receivers. At step 302, a VPN Multicast Extranet Receiver determines that it needs to send a periodic PIM Join message. For example, a specified timer, such as a 60-second timer as typically used in PIM implementations, expires and a VRF at a PE router determines that it needs to send a PIM Join message to prevent timeout of values relating to a MDT Tunnel.

In step 304, the receiver searches for any other receivers present in the same PE router. Step 304 may be implemented in software that causes a PIM process to search an internally maintained list of receivers. If other receivers are present, as tested at step 305, then sending a PIM Join message is suppressed, as shown by step 308. If no receivers are present, then a PIM Join message is sent, at step 306. Step 306 may involve enqueuing a triggered PIM Join message to a neighbor queue of a PE router that is performing the steps of FIG. 3A.

As a first example, referring again to FIG. 1, assume that source Red VRF 122 determines that it needs to send a periodic PIM Join message. VRF 122 searches data stored in PE router 110B to identify any other VPN multicast receivers. VRF 122 determines that another VPN receiver, Blue VRF 108, is present. Therefore, VRF 122 does not send a periodic PIM Join message to MDT Tunnel 114, and always suppresses the sending of such messages. Instead, VRF 122 allows Blue VRF 108 to send such messages.

Conversely, assume that in the configuration of FIG. 1, the Blue VPN is not established, but receivers 104 are in a multicast group that receives from the Extranet source 120. In that case, VRF 122 would not find any other VPN multicast receivers at PE router 110B. Therefore, in that case, VRF 122 would send a normal periodic PIM Join message to MDT Tunnel 114.

Figure 2:
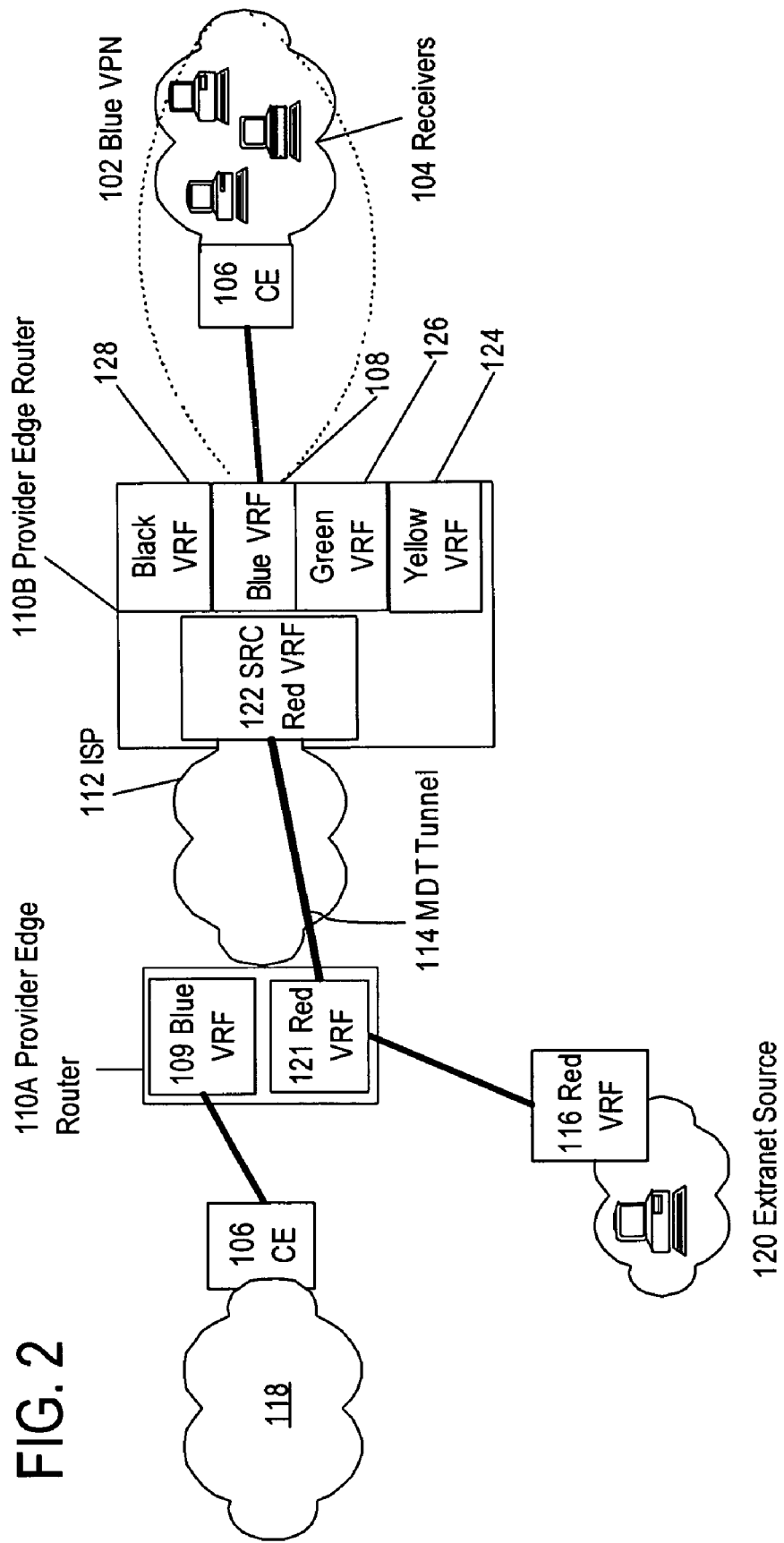
FIG. 2 is a block diagram illustrating a configuration of multiple VPNs on one Provider Edge (PE) router.

FIG. 2 illustrates a case in which multiple receivers exist. FIG. 2 is a block diagram illustrating a configuration of multiple VPNs on one Provider Edge (PE) router. As a second operational example, in the configuration of FIG. 2, each VRF receiver 108, 124, 126, 128 that needs to send a periodic PIM Join message first searches for any other receiver other than itself. In this case, any of the VRF receivers 108, 124, 126, 128 will identify at least one of the others at the time that it needs to send a periodic PIM Join message. Therefore, each such VRF receiver will cease attempting to send the PIM Join message, with one exception.

One and only one PIM Join message needs to be sent to MDT Tunnel 114 to prevent timeout of data that establishes the tunnel. Therefore, according to an embodiment, one VRF Extranet receiver is designated as a principal, and is responsible for sending the PIM Join message. For example, in FIG. 2, Red Source VRF 122 is designated as principal as part of a configuration step. The Red Source VRF 122 detects that there are multiple VPN receivers participating in a multicast that originates at Extranet source 120. Therefore, Red Source VRF 122 sends periodic PIM Join messages to the MDT Tunnel 114.

In one embodiment, the search operation specified above is implemented using the PIM software that executes as part of an operating system of PE router 110B and other PE routers in a network. In one specific embodiment, in which a PE router is a Cisco router from Cisco Systems, Inc., San Jose, Calif., the search operation involves searching a receiver "olist" in the source multicast VRF of the PE router to find information identifying other receivers. If a local receiver or any other extranet receiver is present, then no PIM Join message is queued to the RPF neighbor queue.

Additionally, a counter may be established in an Extranet VRF context, such as the Red Source VRF 122. The counter maintains a number of PIM Join messages that the Red Source VRF 122 has sent to the Extranet source 120 within a specified time period. Every time the Red Source VRF 122 needs to send a PIM Join message, the Red Source VRF examines the counter to determine if a PIM Join message was already sent within the specified time period. If so, then the Red Source VRF 122 does not send, or suppresses sending, another PIM Join message. Thus, The VPN Extranet receiver only sends one PIM message across the MDT Tunnel 114 once every specified time period. At the end of the time period, the counter is reset.

Using these approaches suppresses the number of PIM Join messages that are sent upstream by an Extranet VPN receiver. Therefore, fewer router resources are consumed, and less bandwidth is consumed in the MDT tunnel.

2. Suppressing Unnecessary Triggered Join Messages

Conventional use of the PIM protocol as typically implemented in a router may result in sending too many triggered PIM Join messages to upstream neighbor devices. Under conventional use of PIM, each time that a different Extranet VPN receiver joins a particular multicast group, each source multicast VPN VRF that previously joined sends a Triggered PIM Join message to upstream RPF neighbors on a reverse path towards the multicast source. Thus, the conventional approach results in sending duplicate PIM Join messages. Referring again to FIG. 1 and FIG. 2, assume that both Source Red VRF 122 and another Extranet VPN receiver, not shown, both join a multicast group that includes receivers 104 at approximately the same time. Such a join operation triggers both the Extranet VPN receivers to send PIM Join messages across the MDT Tunnel 114. However, sending multiple messages is unnecessary, because the same destination multicast group is involved in both join operations. Therefore, a second and subsequent triggered PIM Join messages, all sent within a specified timeout period, do not serve any purpose.

In one embodiment, when a receiver VRF sends a Triggered PIM Join packet after joining a multicast group, each Extranet source VRF on the same PE router checks a list of receivers associated with the source VPN. Excluding the receiver that triggered the join operation, if any local VPN receiver or any Extranet VPN receiver is present, then the Extranet source VRF does not send a PIM Join message. If no other such receiver is present in the list, then a PIM Join message is sent. In one embodiment, the PIM Join message is queued to the neighbor queue, and is sent across the MDT Tunnel 114.

FIG. 3B is a flow diagram showing steps in one embodiment of a method of suppressing triggered PIM Join messages sent by Extranet receivers. At step 310, a VPN Multicast Extranet Receiver sends a triggered PIM Join message in response to a join operation initiated by another receiver. For example, another receiver joins a multicast group of which the VPN Multicast Extranet Receiver performing FIG. 3B is a part.

In step 312, the receiver searches for any other receivers present in the same PE router. Step 312 may be implemented in software that causes a PIM process to search an internally maintained list of receivers. If other receivers are present, as tested at step 314, then sending a triggered PIM Join message to upstream devices is suppressed, as shown by step 318. If no receivers are present, then a PIM Join message is sent, at step 316. Step 316 may involve enqueuing a triggered PIM Join message to a neighbor queue of a PE router that is performing the steps of FIG. 3B.

3. Suppressing Unnecessary Prune Messages

Conventional use of the PIM protocol as typically implemented in a router may result in sending too many PIM Prune messages to upstream neighbor devices. Under conventional use of PIM, when an Extranet VPN receiver leaves a multicast group, a PE router sends a PIM prune message corresponding to each member in the group that the receiver left. As a result, in the context of FIG. 1, FIG. 2, duplicate PIM Prune messages are sent across MDT Tunnel 114 to the same Extranet source 120. This causes logical gaps or "black holes" in the information relating to the group upon each member's departure. Further, the Extranet source 120 could interpret the PIM Prune messages as indicating that the entire VPN has left the group, therefore the Extranet source could close the MDT Tunnel 114.

In this context, as an example, the term "black hole" refers to a state in which a multicast Extranet receiver has information indicating that it is on the multicast distribution tree and expecting to receive the traffic from Extranet Source 120, but in fact if a PIM Prune message is sent by the Black VRF in PE Router 10B, because all Black VRF receivers have left, MDT Tunnel 114 will be relinquished, and all other VRFs, such as the Blue, Green and Yellow VRF of FIG. 2 will stop receiving traffic for up to 3 minutes. Relinquishment of MDT Tunnel 114 is done by Red VRF 201 in PE Router 110A. Extranet Source 120 is not aware of this problem, and will keep sending traffic.

In one embodiment, when a receiver VRF sends a PIM Prune packet after leaving a multicast group, each Extranet source VRF on the same PE router checks a list of receivers associated with the source VPN. Excluding the receiver that triggered the leave operation, if any local VPN receiver or any Extranet VPN receiver is present, then the Extranet source VRF does not send a PIM Prune message. If no other such receiver is present in the list, then a PIM Prune message is queued to the neighbor queue, and is sent across the MDT Tunnel 114.

Figure 3C:
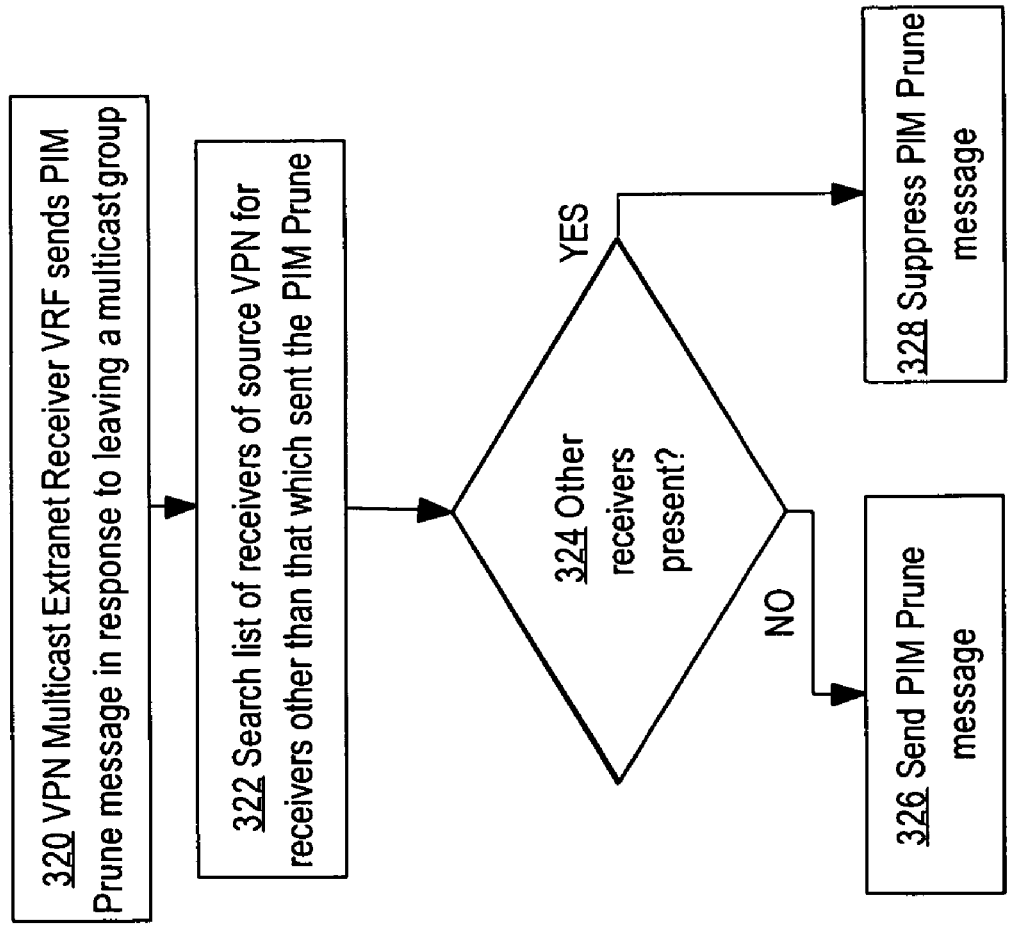
FIG. 3C is a flow diagram showing steps in one embodiment of a method of suppressing PIM Prune messages sent by Extranet receivers.

FIG. 3C is a flow diagram showing steps in one embodiment of a method of suppressing PIM Prune messages sent by Extranet receivers. At step 320, a VPN Multicast Extranet Receiver sends a PIM Prune message in response to a group leave operation performed by another receiver. For example, step 320 may involve determining that another receiver is leaving a multicast group of which the VPN Multicast Extranet Receiver performing FIG. 3C is a part.

In step 322, the receiver searches for any other receivers present in the same PE router. Step 322 may be implemented in software that causes a PIM process to search an internally maintained list of receivers. If other receivers are present, as tested at step 324, then sending a PIM Prune message to upstream devices is suppressed, as shown by step 328. If no receivers are present, then a PIM Prune message is sent, at step 326. Step 326 may involve enqueuing a PIM Prune message to a neighbor queue of a PE router that is performing the steps of FIG. 3C.

4. Results of Suppression Processes

In certain embodiments, each of the processes of FIG. 3A, FIG. 3B, FIG. 3C, applied in the context of a network of the type shown in FIG. 1, FIG. 2, provides a useful, concrete, and tangible result. For example, embodiments of the processes that are performed in a computer apparatus, when performing at least steps 305, 306, and 308 of FIG. 3A, or steps 314, 316, and 318 of FIG. 3B, or steps 324, 326, or 328 of FIG. 3C, involve manipulation and modification of data that is stored in tangible computer-readable media, such as electronic memory.

Further, performing the processes results in changing data structures that are created by software elements that implement the processes, which in turns results in changing a state of data recorded in the memory, which in turn results in changing a state of energization of particular semiconductor transistors, MOSFETs and other structures that comprise the computer memory. Performing the processes results in an apparatus either sending or not sending specific kinds of electronic messages that are communicated using real signals in the form of electric voltages on tangible media such as copper wire.

E. Hardware Overview

Figure 4:
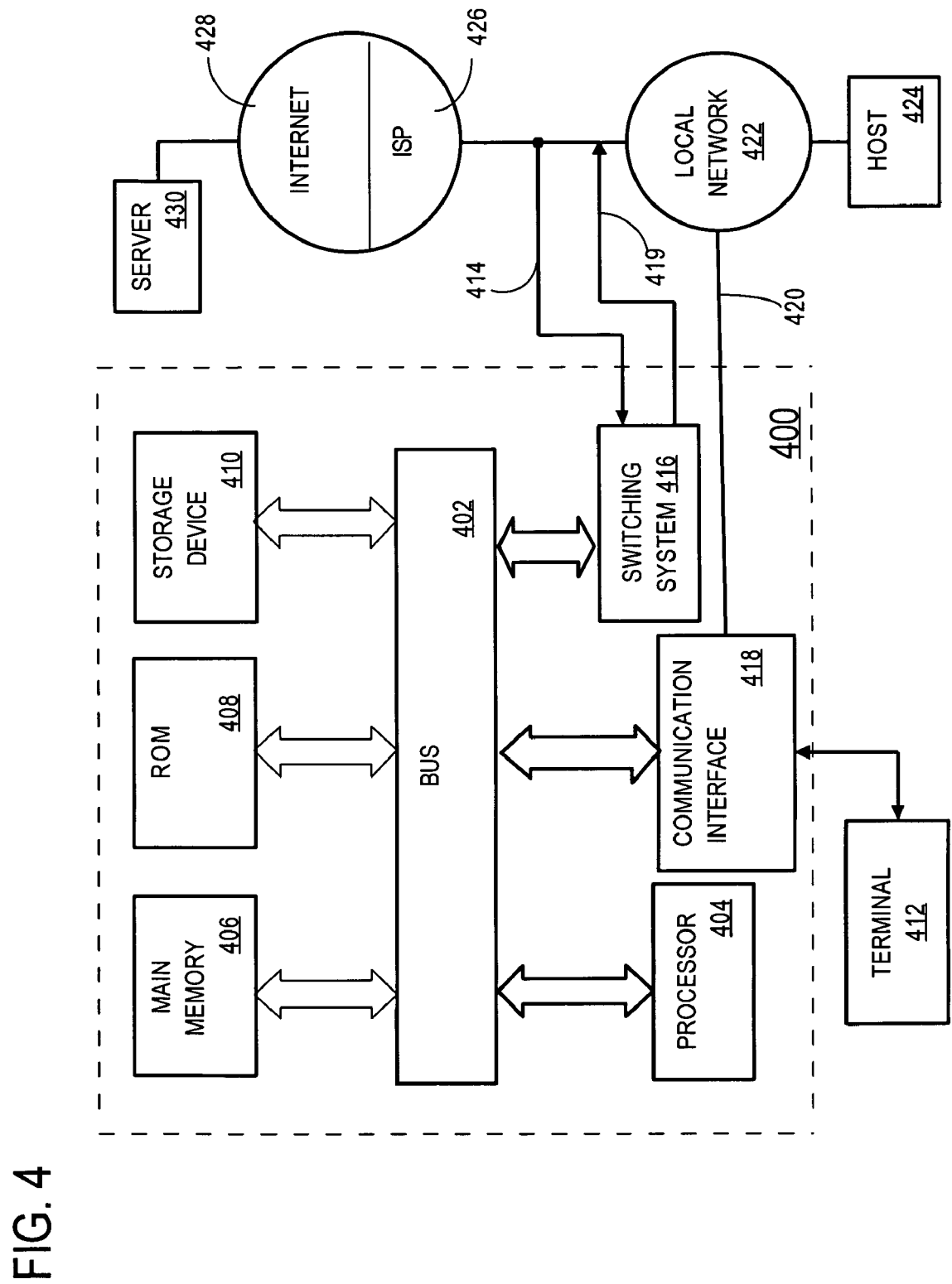
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for suppressing PIM messages from extranet receivers. According to one embodiment of the invention, suppressing PIM messages from extranet receivers is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for suppressing PIM messages from extranet receivers as described herein.

The received code may be executed by processor 404 as it is received, and/or stored in storage device 410, or other non-volatile storage for later execution. In this manner, computer system 400 may obtain application code in the form of a carrier wave.

F. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the steps of:
at an Extranet Virtual Private Network (VPN) receiver, hosted in a router of a packet-switched network, determining whether to send a Protocol Independent Multicast (PIM) message;
wherein the Extranet VPN receiver is associated with a multicast group in the packet-switched network;
determining by the router whether the multicast group includes VPN receivers that are hosted in the router other than the Extranet VPN receiver;
sending the PIM message by the router to upstream network elements in the packet-switched network only when the multicast group does not include any VPN receivers that are hosted in the router, other than the Extranet VPN receiver, and otherwise suppressing sending the PIM message.

2. The method of claim 1, wherein the PIM message is a PIM Join message.

3. The method of claim 1, wherein the PIM message is a triggered PIM Join message.

4. The method of claim 1, wherein the PIM message is a PIM Prune message.

5. The method of claim 1, further comprising the steps of: maintaining by the router a count of PIM messages that are sent in a specified time period; sending the PIM message by the router to the upstream network elements only when no other PIM message has been sent, based on the count, in the specified time period.

6. The method of claim 1, wherein the determining step comprises searching by the router a list of VPN Multicast receivers stored in the router to determine whether the list contains entries for any receiver other than the Extranet VPN receiver.

7. The method of claim 1, wherein the packet-switched network is an Internet Service Provider network that includes a provider edge router, and wherein the steps of the method are performed in one or more elements that are hosted in the provider edge router.

8. The method of claim 7, wherein the upstream network elements are communicatively coupled by a Multicast Distribution Tree (MDT) tunnel.

9. The method of claim 7, wherein the multicast group comprises one or more multicast group receivers within an Intranet.

10. A computer-readable volatile or non-volatile storage medium, carrying one or more sequences of instructions for suppressing the number of messages sent to a destination, wherein execution of the one or more sequence of instructions by one or more processors causes the one or more processors to perform the steps of:
at an Extranet Virtual Private Network (VPN) receiver, hosted in a router of a packet-switched network, determining whether to send a Protocol Independent Multicast (PIM) message;
wherein the Extranet VPN receiver is associated with a multicast group in the packet-switched network;
determining whether the multicast group includes VPN receivers that are hosted in the router other than the Extranet VPN receiver;
sending the PIM message to upstream network elements in the packet-switched network only when the multicast group does not include any VPN receivers that are hosted in the router, other than the Extranet VPN receiver, and otherwise suppressing sending the PIM message.

11. An apparatus for suppressing the number of PIM messages sent to a destination comprising:
one or more processors;
means for determining whether to send a Protocol Independent Multicast (PIM) message at an Extranet Virtual Private Network (VPN) receiver hosted in a router of a packet-switched network;
wherein the Extranet VPN receiver is associated with a multicast group in the packet-switched network;

means for determining whether the multicast group includes VPN receivers that are hosted in the router other than the Extranet VPN receiver;

means for sending the PIM message to upstream network elements in the packet-switched network only when the multicast group does not include any VPN receivers that are hosted in the router, other than the Extranet VPN receiver, and otherwise suppressing sending the PIM message.

12. An apparatus, comprising:

one or more processors;

a computer-readable volatile or non-volatile storage medium carrying one or more sequences of instructions for suppressing the number of messages sent to a destination, wherein execution of the one or more sequence of instructions by one or more processors causes the one or more processors to perform the steps of:

at an Extranet Virtual Private Network (VPN) receiver, hosted in a router of a packet-switched network, determining whether to send a Protocol Independent Multicast (PIM) message;

wherein the Extranet VPN receiver is associated with a multicast group in the packet-switched network;

determining whether the multicast group includes VPN receivers that are hosted in the router other than the Extranet VPN receiver;

sending the PIM message to upstream network elements in the packet-switched network only when the multicast group does not include any VPN receivers that are hosted in the router, other than the Extranet VPN receiver, and otherwise suppressing sending the PIM message.

13. The computer-readable volatile or non-volatile storage medium of claim 10, wherein the PIM message is one of: (a) a PIM Join message, (b) a triggered PIM Join message, and (c) a PIM Prune message.

14. The computer-readable volatile or non-volatile storage medium of claim 10, further comprising instructions for performing the steps of:

maintaining a count of PIM messages that are sent in a specified time period; and sending the PIM message to the upstream network elements only when no other PIM message has been sent, based on the count, in the specified time period.

15. A computer-readable volatile or non-volatile storage medium of claim 10, wherein the packet-switched is an Internet Service Provider network that includes a provider edge router, and wherein the one or more sequences of instructions are in the provider edge router.

16. The computer-readable volatile or non-volatile storage medium of claim 10, wherein the upstream network elements are communicatively coupled by a Multicast Distribution Tree (MDT) tunnel.

17. The apparatus of claim 11, wherein the PIM message is one of: (a) a PIM Join message, (b) a triggered PIM Join message, and (c) a PIM Prune message.

18. The apparatus of claim 11, further comprising:

means for maintaining a count of PIM messages that are sent in a specified time period; and means for sending the PIM message to the upstream network elements only when no other PIM message has been sent, based on the count, in the specified time period.

19. The apparatus of claim 11, wherein the upstream network elements are communicatively coupled by a Multicast Distribution Tree (MDT) tunnel.

20. The apparatus of claim 12, wherein the PIM message is one of: (a) a PIM Join message, (b) a triggered PIM Join message, and (c) a PIM Prune message.

21. The apparatus of claim 12, further comprising instructions for performing the steps of:

maintaining a count of PIM messages that are sent in a specified time period; and sending the PIM message to the upstream network elements only when no other PIM message has been sent, based on the count, in the specified time period.

22. The apparatus of claim 12, wherein the upstream network elements are communicatively coupled by a Multicast Distribution Tree (MDT) tunnel.

* * * * *